United States Patent [19]

Sato et al.

[11] 4,103,078

[45] Jul. 25, 1978

[54] METHOD FOR PRODUCING POLYMERS OF ALPHA-OLEFIN

[75] Inventors: Akihiro Sato, Yokosuka; Shiro Konotsune, Yokohama; Atsuyuki Kachi, Yokohama; Hiroshi Shimizu, Yokohama, all of Japan

[73] Assignee: Chisso Corporation, Osaka, Japan

[21] Appl. No.: 340,854

[22] Filed: Mar. 13, 1973

Related U.S. Application Data

[63] Continuation-in-part of Ser. No. 54,865, Jul. 14, 1970, abandoned.

[30] Foreign Application Priority Data

Aug. 1, 1969 [JP] Japan .................................. 44-60798

[51] Int. Cl.$^2$ ............................................. C08F 4/02
[52] U.S. Cl. ............................... 526/115; 252/429 B; 252/429 C; 526/97; 526/121; 526/124; 526/129; 526/132; 526/347; 526/348; 526/348.6; 526/351; 526/352
[58] Field of Search ................ 260/94.9 D, 94.9 DA, 260/94.9 E, 88.2; 526/97, 115, 121, 124, 129, 132

[56] References Cited

U.S. PATENT DOCUMENTS

| | | | |
|---|---|---|---|
| 3,085,999 | 4/1963 | Tung | 260/94.9 E |
| 3,223,690 | 12/1965 | Wilsher et al. | 260/94.9 E |
| 3,257,332 | 6/1966 | Ziegler et al. | 252/429 |
| 3,526,616 | 9/1970 | Delbouille et al. | 260/94.9 DA |
| 3,535,299 | 10/1970 | Dassesse et al. | 260/94.9 DA |
| 3,676,415 | 7/1972 | Diedrich et al. | 260/94.9 E |

FOREIGN PATENT DOCUMENTS

| | | | |
|---|---|---|---|
| 1,560,467 | 2/1969 | France. | |
| 2,035,943 | 2/1971 | Fed. Rep. of Germany. | |
| 1,001,820 | 8/1965 | United Kingdom | 260/94.9 E |
| 1,140,649 | 1/1969 | United Kingdom. | |

*Primary Examiner*—Edward J. Smith
*Attorney, Agent, or Firm*—Fred Philpitt

[57] ABSTRACT

Polymers of α-olefin such as polyethylene, polypropylene, copolymers of ethylene with propylene, butene-1 or styrene, are produced by the (co-) polymerization using a catalyst obtained by mill-mixing an oxide of a metal belonging to I, II, III, VII or VIII Group of the Periodic Table of Elements such as MgO or $SiO_2$ or $B_2O_3$, with a trivalent metal halide such as $AlCl_3$, then reacting the resultant mixture with a transition metal compound such as $TiCl_4$ in the presence of an aromatic compound such as xylene, and activating the resultant solid reaction product with an organoaluminum compound such as triethyl aluminum.

In the preparation of the present catalyst, no dehydrochlorination occurs. The present catalyst has an excellent utilization efficiency of transition metal compound in the polymerization. Further, no polymer film forms on the wall surface of the polymerization vessel.

7 Claims, No Drawings

METHOD FOR PRODUCING POLYMERS OF ALPHA-OLEFIN

This application is a continuation-in-part of applicants' copending application Ser. No. 54,865, filed July 14, 1970, now abandoned.

DESCRIPTION OF THE INVENTION

The present invention relates to a method for producing polymers of α-olefin. Particularly, it relates to a method for polymerizing or copolymerizing an α-olefin in the presence of a catalyst obtained by mixing on oxide of a metal belonging to I, II, III, VII or VIII Group of the Periodic Table of Elements or $SiO_2$ or $B_2O_3$, with a trivalent metal halide, reacting the resultant mixture with a transition metal compound in the presence of an aromatic compound, and activating the resultant solid reaction product with an organoaluminum compound.

The present inventors have previously disclosed in the copending patent application of U.S. Ser. No. 794,421 filed Jan. 27, 1969 and continuation-in-part application filed at Mar. 27, 1970 (Ser. No. 23,484), both applications now abandoned, a method for polymerizing α-olefins in the presence of a catalyst obtained by subjecting a trivalent metal halide together with at least one kind of compound selected from the group consisting of halide hydrates, sulfide hydrates, sulfate hydrates, hydroxides, hydroxidie hydrates of metals belonging to Groups I - VIII of the Periodic Table, to a burning reaction so as to cause active groups to form on the surface of the resultant burning reaction product, reacting the burning reaction product with a transition metal compound, and activating the resultant reaction product with an organoaluminum compound (see U.S Ser. No. 23,484).

According to the above-mentioned method, there can be obtained such superior effectivenesses that the utilization efficiency of the transition metal compound is very high, the effect of the reduction in molecular weight by means of hydrogen is remarkable, no polymer film forms on the wall of the polymerization vessel, and so on.

On the other hand, in the invention of the abovementioned application, it is necessary to carry out the burning reaction, and such reaction is accompanied with dehydrochlorination during the burning reaction and sometimes an additional dehydrochlorination occurs in the reaction between the active groups on the surface of the burning reaction solid product and the transition metal compound and thus the corrosion of the apparatuses is brought about. In addition to such a drawback, the abovementioned invention contains such an unstable factor that the bulk density of the resultant polymer depends upon the temperature of the burning reaction.

A main object of the present invention is to provide a method for producing polymers of α-olefin by the use, as a catalyst forming component, of a solid reaction product obtained by substituting a metal oxide for a hydrate of a compound of metal or metal hydroxides used in the method of the above-mentioned prior application, whereby burning reaction becomes unnecessary in the reaction thereof with a trivalent metal halide, and hence the operation becomes easy and no disadvantageous dehydrochlorination is accompanied.

Another object of the present invention is to provide a method characterized by a higher utilization efficiency for transition metal, no formation of polymer film on the wall surface of a polymerization vessel during the polymerization, and excellent control of molecular weight by means of hydrogen.

Still another object of the present invention is to provide a method which enables to maintain the dispersibility of catalyst excellently and yields polymers of better physical properties.

Further objects will become apparent from the following descriptions.

The method of the present invention resorts to a method for producing polymers of α-olefins which comprises:

(a) mill-mixing together
  (1) 1 mol of a metal oxide of non-metal oxide selected from the group consisting of $Cu_2O$, $CuO$, $Ag_2O$, $Ag_2O_3$, $MgO$, $CaO$, $SrO$, $BaO$, $ZnO$, $CdO$, $Ga_2O_3$, $SnO$, $SnO_2$, $PbO$, $Pb_2O_3$, $Pb_3O_4$, $ZrO_2$, $Bi_2O_3$, $V_2O_5$, $WO_3$, $MnO$, $Mn_2O_3$, $FeO$, $Fe_2O_3$, $Fe_3O_4$, $CoO$, $Co_3O_4$, $NiO$, $NaAlO_2$, $CaAl_2O_4$, $MgAl_2O_4$, $Mg_2SiO_4$, $MgWO_4$ and $Mg_6MnO_8$ or $SiO_2$ or $B_2O_3$, with
  (2) 0.01-2 mols of a trivalent metal halide from the group consisting of $AlCl_3$, $AlBr_3$ and $FeCl_3$, (b) reacting the resultant mixture at a temperature between room temperature and 300° C with a transition metal compound selected from the group consisting of titaniumtetrachloride, vanadiumtetrachloride and vanadiumoxytrichloride in the presence of an aromatic compound selected from the group consisting of benzene, naphthalene, pyridine, toluene, xylene, mesitylene, durene, ethylbenzene, isopropylbenzene, 2-ethylnaphthalene, 1-phenyl-naphthalene, dimethylaniline, N-methyldiphenylamine, triphenylamine, nitrobenzene, p-nitrosotolunen, anisole, phynylether, xylenol, and 2, 6-dit-butyl-4-methylphenol, and (c) activating the product of step (b) with an organoaluminum compound selected from the group consisting of trimethylaluminum, triethylaluminum, diethylaluminumchloride, ethylaluminumsesquichloride, and ethylaluminumdichloride so as to thereby form a polymerization catalyst, (d) introducing into a polymerization zone that contains said polymerization catalyst
  (1) a monomer selected from the group consisting of ethylene, propylene, and butene-1, or
  (2) said monomer set forth in (d) (1) and a monomer different therefrom consisting of ethylene, propylene, butene-1, hexene-1, octene-1, decene-1, 3-methyl-1-butene, and 4-methyl-1-pentene, and styrene, (e) effecting polymerization under polymerization conditions, and (f) recovering the resulting polymerization product.

Said metal oxide or non-metal oxide will hereinafter be abbreviated merely to metal oxide(s).

These metal oxides and the trivalent metal halides are mill-mixed at room temperature in the atmosphere of nitrogen by means of a mill such as vibration mill, ball mill, tube mill, rod mill or the like. As to the extent of mill-mixing, it is preferable to mill the two components into powders of 150-250 meshes in the range of time of 20 minutes to 30 hours although the extent depends on the kind of the mill to be employed. If the mill-mixing is insufficient, the resulting catalyst has a drawback of low activity. As to the mixing ratio, about 0.01 – 2 mols of the trivalent metal halide per one mol of the metal oxide are necessary.

As aromatic compounds to be present in the reaction between the mixture of the metal oxide with the trivalent metal halide and the transition metal compound, there are illustrated benzene, naphthalene, pyridine, or the like, and further, alkylsubstituted benzenes such as toluene, xylene, mesitylene, durene, ethylbenzene, isopropylbenzene or the like, polynuclear aromatic ring derivatives such as 2-ethyl-naphthalene, 1-phynyl-naphthlene or the like, aniline derivatives having no active hydrogen such as dimethylaniline, aromatic amine derivatives having no active hydrogens such as N-methyl-dephenylamine, triphenylamine, nitro and nitroso derivatives such as nitrobenzene, nitrosobenzene, p-nitroso-toluene, halogenides such as monochlorobenzene, orthochlorotoluene, alkoxide derivatives such as anisole, ether derivatives such as phenylether, phenols such as xylenol, 2, 6-di-t-butyl-4-methyl-phenol, or the like.

These aromatic compounds ("aromatic compounds" referred to hereinafter means these illustrated aromatic compounds) can preferably be used alone, but also be used in a mixture system thereof with a saturated aliphatic hydrocarbon such as n-heptane, octane or the like.

As transition metal compounds to be used, there are illustrated halides and oxyhalides of transition metals belonging to Groups IVa and Va of the Periodic Table, such as titanium, vanadium, preferably titanium tetrachloride, vanadium tetrachloride, vanadium oxytrichloride or the like.

The reaction mechanism by which the mixture of the metal oxide with the trivalent metal halide is reacted with the transition metal compound in the presence of an aromatic hydrocarbon and/or its derivative, has not yet been confirmed. However, it has been found that the transition metal compound after the reaction cannot be removed from the surface of the solid which is the mixture of the metal oxide with the trivalent metal halide, by a physical means such as washing.

In the present invention, the metal oxide, trivalent metal halide, aromatic compound and transition metal compound are each an indispensable component, and even if any one of them is deficient, a polymerization catalyst having a high activity cannot be obtained. For example, even if a reaction between a mixture of a metal oxide with a trivalent metal halide and a transition metal compound, is carried out in the absence of an aromatic compound, a solid catalyst having a high activity cannot be obtained. Also, even if a reaction between a metal oxide and a transition metal compound is carried out in the presence of an aromatic compound but without using any trivalent metal halide, there can be obtained only a catalyst having a much less activity than that of a solid catalyst obtained according to the present invention.

The ratio of the reaction mixture of milled mixture and transition metal compound is e.g. 1 g of milled mixture to 0.01 – 3 g of transition metal compound.

The contents of transition metal compound in the reaction product are 1 to 30 mg of transition metal/g reaction product.

If the feeding ratio of the transition metal compound to the milled mixture is below 0.01 g/g, the content of transition metal compound in the solid reaction product (catalyst) is too low and its catalytic activity is low; on the other hand, even if the feed of transition metal compound is more than 3 g/g - milled mixture, the content of transition metal compound in the reaction product does not increase so much, and increase in the polymerization activity of the reaction product (catalyst) is unexpected.

In the reaction between a transition metal compound and a mixture of a metal oxide with a trivalent metal halide in the presence of an aromatic compound, too low temperature is not preferable because the fixation of the transition metal compound cannot be carried out well. While too high temperature is also not preferable because of the difficulty of reaction operation. The reaction is usually carried out at a temperature within a range of room temperature to 300° C, preferably 50° to 200° C.

As to the above-mentioned reaction time, 5 minutes to 20 hours, preferably 20 minutes to 5 hours are suitable. If it is shorter than 5 minutes, the reaction is insufficient, while even if it exceeds 20 hours, the activity of the resulting catalyst cannot be further improved.

The reaction between a mixture of a metal oxide with a trivalent metal halide and a transition metal compound in the presence of an aromatic compound can be carried out by any publicly known method.

For example, it can be carried out by suspending a mixture of a metal oxide with a trivalent metal halide in a solvent of an aromatic compound or in a solvent mixture of aromatic and aliphatic hydrocarbons and then adding a transition metal compound to the resultant suspension to cause the reaction, or by mixing a transition metal compound and said solvent and then mixing the resultant mixture and a mixture of a metal oxide and a trivalent metal halide to cause the reaction. The solid product formed by these methods is filtered and washed cautiously with an anhydrous hydrocarbon solvent till no trace amount of transition metal element remains in the washing liquid, to be used for the subsequent preparation of catalyst. Alternatively, a slurry in which the above-mentioned four components have been fully reacted together and no free transition metal element remains, can be used as it is, without filtration.

Further, a mixture of a metal oxide with a trivalent metal halide pretreated with an aromatic compound solvent or the vapor thereof, can be also reacted with a transition metal compound.

This solid product must be activated by contacting it with an organoaluminum compound. Particularly suitable compound for such activators are trialkyl aluminums such as trimethyl aluminum, triethyl aluminum or the like, and alkylaluminum halides (dialkylaluminum monohalides, alkylaluminum sesquihalides and alkylaluminum dihalides) such as diethylaluminum monochloride, ethylaluminum sesquichloride, monoethylaluminum dichloride or the like.

The catalysts of the present invention perform the good catalyst action in the homopolymerization of αolefin and the copolymerization of α-olefin with each other.

The α-olefins include broadly those which are generally known as α-olefin: straight chain monoolefins such as ethylene, propylene, butene-1, hexene-1, octene-1, decene-1, branched chain monoolefins such as 3-methyl-1-butene, 4-methyl-1-pentene or the like. Styrene can be substituted for said α-olefins.

The polymerization reaction is usually carried out in an inert hydrocarbon solvent, and better results are obtained generally at a temperature of $-50°$ C to about 150° C and under a pressure of atmospheric one to 40 kg/cm$^2$.

In carrying out the present invention, the addition of titanium alkoxide to the polymerization system, enables to control the density of products, particularly in the polymerization of ethylene, and further improves remarkably the physical properties of the polymer thus obtained, particularly the anti-stress cracking property. The addition of titanium alkoxide also insures the better dispersibility of catalyst, prevents the aggregation of polymer particles, and yields a polymer of uniform and fine particles. Further it can increase the activity of catalyst so much that the yield of polymer per unit catalyst is greatly increased and hence the removal of residual catalyst by the treatment after the polymerization, for example, such as deactivation, washing and drying of catalyst becomes easier on account of reduced amount of the catalyst used. Furthermore since the control of molecular weight of polymer can be carried out very easily and effectively by the addition of titanium alkoxide, the production of the polymer having the same molecular weight can be carried out under a lower polymerization pressure and by the use of a smaller apparatus. As preferable titanium alkoxides, there are illustrated titanium tetraalkoxides, more concretely, titanium tetra-n-butoxide, titanium tetraethoxide, titanium tetramethoxide or the like.

The suitable amount of titanium alkoxide to be used in generally within a range of 0.1 to 5.0 millimole per gram of solid product. If the amount of titanium alkoxide to be used is less than the above-mentioned range, its effectiveness becomes smaller, whereas if it is greater than the above-mentioned range, the soluble part in the polymerization product becomes larger.

A great advantage attained in the production of the polymerization catalyst according to the present invention lies in that no dehydrochlorination is accompanied in the reaction of a metal oxide and a trivalent metal oxide and a trivalent metal halide, and further in the reaction thereof with a transition metal compound in the presence of an aromatic compound, because of the use of a metal oxide containing no hydroxyl group on the surface of the solid. Accordingly, there is no corrosion of an apparatus and a stable solid catalyst can be prepared quantitatively with a good reproducibility and in shorter steps.

With regard to the above-mentioned fact that no dehydrochlorination occurs between the metal oxide and trivalent metal halide, we conducted mixing experiments of MgO and $AlC_3$ together with those of $Mg(OH)_2$ and $AlCl_3$ as controls. The results are shown as Experiment 1 after Example 23.

Another advantage of the present invention lies in that the utilization efficiency of the transition metal compound is extremely high, as apparent from the fact that the yield of polymer per gram of the transition metal used per hour amounts to $10^4$ polymer g/Ti-g/hr.

As a further advantage of the present invention, it is to be pointed out that polymer film does not form on the wall of polymerization vessel which is often observed in case of a catalyst comprising a liquid transition metal compound such as titanium tetrachloride and an organoaluminum compound becoming the origin of harmful influence such as difficulty of the control of polymerization reaction, and deterioration of the quality of product, etc.

A still further advantage of the present invention lies in that the control of molecular weight of the polymer can be carried out very well if a suitable amount of hydrogen is added to the polymerization system using the new catalyst of the present invention.

The following examples will further illustrate this invention.

The MIs (melt indexes) in the Examples were measured by the use of a melt indexer, under the conditions of 190° C, a load of 500g, and a unit of g/10 minutes.

EXAMPLE 1

(a) Preparation of catalyst:

10g of magnesium oxide and 4g of anhydrous aluminum chloride were mixed and pulverized at room temperature for 20 minutes, by means of a cylinder-type mill mixer (Spex mill mixer made by Spex Industry Ltd.) having a capacity of 100c.c. and containing two stainless steel balls of 10mm in diameter and four stainless steel balls of 3mm in diameter. 10g of the resultant mixture was then put in 200 ml pear-form-bottle flask. 15 ml of xylene and 1 ml of titanium tetrachloride were added thereto, and reacted together unser stirring, in the atmosphere of nitrogen, at 120° C, for one hour. After completion of the reaction, the resultant product was filtered in a dry box of which the atmosphere has been replaced by nitrogen, washed four times with each 10 ml of normal hexane for complete removal of unreacted titanium tetrachloride, and dried under a reduced pressure for one hour to give a solid product (I). This solid product (I) contained 11.8 mg of titanium per gram thereof.

(b) Polymerization of ethylene:

Into a 1 L stainless steel reaction vessel provided with a stirrer, after flushed with nitrogen gas, were introduced 500 ml of normal-hexane, 179 mg of the above-mentioned solid product and 280 mg of triethyl aluminum. The reaction vessel was sealed, and the mixture was subjected to a polymerization reaction under a hydrogen gauge pressure of 1.0 kg/cm$^2$ and an ethylene gauge pressure of 3.0 kg/cm$^2$, at a polymerization temperature of 80° C and for one hour. The polymer thus obtained was of fine powders and no adhesion of the polymer to the wall surface of the polymerization vessel was observed. After completion of the reaction, the catalyst was deactivated according to a usual method, and washing, filtration and drying were carried out to give 69g of white powders. The formation velocity of polymer per gram of the solid product (I) was 385 g/g/hr. and the yield of polymer per gram of titanium contained in the solid product (I) was 32,600 polymer g/Ti g/hr. Thus the yield was very high. MI = 0.18

EXAMPLE 2

A solid product (II) was obtained in a similar way to Example 1 except that 15 ml of benzene was substituted for 15 ml of xylene. The solid product (II) contained 8.5 mg of titanium in one gram thereof.

Polymerization of ethylene was carried out in a similar way to example 1 by the use of the solid product (II). The results are shown in Table 1.

EXAMPLE 3

A solid product (III) was obtained in a similar way to Example 1 except that 15 ml of monochlorobenzene was substituted for 15 ml of xylene. The product (III) contained 6.8 mg of titanium in one gram thereof.

The results of the polymerization of ethylene carried out in a similar way of Example 1 by the use of the solid product (III), are shown in Table 1.

EXAMPLE 4

A solid product (IV) was obtained in a similar way to Example 1 except that 15 ml of anisole was substituted for 15 ml of xylene. The solid product (IV) contained 18.5 mg of titanium in one gram thereof.

Polymerization of ethylene was carried out in a similar way to Example 1 by the use of the solid product (IV). The results are shown in Table 1.

EXAMPLE 5

A solid product (V) was obtained in a similar way to Example 1 except that a liquid mixture of 15 ml of normal-heptane and 5 ml of dimethyl aniline was substituted for 15 ml of xylene. The solid product (V) contained 4.9 mg of titanium in one gram thereof.

Polymerization of ethylene was carried out in a similar way to Example 1 by the use of the solid product (V). The results are shown in Table 1.

COMPARATIVE EXAMPLE 1

A solid product (VI) was obtained in a similar way to Example 1 except that 15 ml of normal-heptane was substituted for 15 ml of xylene. The solid product contained 8.7 mg of titanium in one gram thereof.

Polymerization of ethylene was carried out in a similar way to Example 1 by the use of the solid product (VI). The results are shown in Table 1.

COMPARATIVE EXAMPLE 2

A solid product (VII) was obtained in a similar way to Example 1 except that no solvent was used in place of 15 ml of xylene, but 5 ml of titanium tetrachloride was substituted for 1 ml thereof. The solid product (VII) contained 2.8 mg of titanium atoms in one gram of the solid product.

Polymerization of ethylene was carried out in a similar way to Example 1 by the used of the solid product (VII). The results are shown in Table 1.

The results of Examples 1 - 5 and Comparative Examples 1 and 2 are summarized in Table 1.

Table 1

Effects of solvents used in the preparation of solid products

|   | Solvent | Polymer Formation velocity* | MI | Bulk density |
|---|---|---|---|---|
| Example 1 | Xylene | 385 | 0.18 | 0.213 |
| Example 2 | Benzene | 249 | 0.25 | 0.218 |
| Example 3 | Monochlorobenzene | 197 | 0.19 | 0.189 |
| Example 4 | Anisole | 258 | 0.30 | 0.219 |
| Example 5 | n-Heptane Dimethylaniline mixture | 189 | 0.28 | 0.222 |
| Comparative Example 1 | n-Heptane | 52 | Unmeasurable | 0.200 |
| Example 2 | — | 34 | . | 0.169 |

*Polymer g/solid product g/hr

COMPARATIVE EXAMPLE 3

Magnesium oxide dried at 150° C for 48 hours was finely pulverized without adding aluminum chloride. 10 g of the resultant powders was then introduced into a 200 ml pear-form-bottle flask. 15 ml of xylene and 1 ml of titanium tetrachloride were added thereto. A solid product (VIII) was obtained in a similar way to Example 1. This solid product (VIII) contained 5.7 mg of titanium in one gram thereof. Polymerization of ethylene was carried out in a similar way to Example 1 using 162 mg of the solid product (VIII) and 280 mg of triethyl aluminum. The amount of the polymer thus obtained was 6.2 g and the yield of the polymer was 38 g/g/hr. Thus, the activity was much lower than that in Example 1 carried out in the presence of aluminum chloride.

COMPARATIVE EXAMPLE 4

(a) Preparation of catalyst:

Magnesium oxide dried at 150° C for 48 hours was finely pulverized without adding aluminum chloride. 10 g of the resultant powders was then introduced into a 200 ml pear-form-bottle flask.

15 ml of xylene and 1 ml of titanium tetrachloride and 4 g of pulverized anhydrous aluminum chloride were added thereto and reacted together under stirring in the atmosphere of nitrogen, at 120° C, for one hour. A solid product (catalyst A-1) was obtained. This solid product (catalyst A-1) contained 6.5 mg of titanium in one gram thereof.

(b) Polymerization of ethylene:

In to a 1 L stainless steel reaction vessel provided with a stirrer, after flushed with nitrogen gas, were introduced 500 ml of normal-hexane, 180 mg of the above-mentioned solid product and 280 mg of triethyl aluminum. The reaction vessel was sealed, and the mixture was subjected to a polymerization reaction under a hydrogen gauge pressure of 1.0 kg/cm$^2$ and an ethylene gauge pressure of 3.0 kg/m$^2$, at a polymerization temperature of 80° C and for 1 hour. The polymer thus obtained was of fine powders and no adhesion of the polymer to the wall surface of the polymerization vessel was observed. After completion of the reaction, the catalyst was deactivated according to a usual method, and washing, filtration and drying were carried out to give 10.1 g of powders. The formation velocity of polymer per gram of titanium contained in the solid product (A-1) was 2,880 polymer g/Ti g/atom. $C_2^{32}$/hr. (MI: not measurable).

This Comparative Example was compared with Example 1. In spite of the fact that the Comparative Example was almost the same with Example 1 except for the adding procedure of AlCl$_3$ in the preparation of catalyst, the rate of formation of polymer per gram of titanium contained in the solid product, of the Comparative Example was about 1/3.8 of that of Example 1, as seen below.

Example 1: 32,600 polymer g/Ti g/hr (C$_2$=3.0 kg/cm$^2$) =10,866 polymer g/Ti g/atom. $C_2^{32}$/hr Comparative Example 4: 2,880 polymer g/Ti g/atom. $C_2^{32}$/hr

EXAMPLE 6

A solid product (IX) was obtained in a similar way to Example 1 except that 10 g of zinc oxide was substituted for 10 g of magnesium oxide. The solid product (IX) contained 5.7 mg of titanium in one gram thereof.

Polymerization of ethylene was carried out in a similar way to Example 1 by the use of the solid product (IX). The results are shown in Table 2.

EXAMPLE 7

10 g of quartz sand (silicon dioxide) and 4 g of anhydrous aluminum chloride were mixed and pulverized. 10 g of the resultant mixture was then introduced into a 200 ml pear-form bottom flask. 15 ml of o-chlorotoluene and 1 ml of titanium tetrachloride were added thereto, and reacted together under stirring in the atmosphere of nitrogen at 150° C, for one hour. Subsequent operations were carried out in a similar way to Example 1. Thus, a solid product (XI) containing 4.2 mg of titanium in one gram thereof was obtained.

Polymerization of ethylene was carried out in a similar way to Example 1 by the use of the solid product (XI). The results are shown in Table 2.

EXAMPLE 8

A solid product (XV) containing 8.9 mg of titanium in one gram thereof, was obtained in a similar way to Example 1 except that 10 g of manganic-managnous oxide ($Mn_3O_4$) was used. Polymerization of ethylene was carried out in a similar way to Example 1 by the use of the solid product (XV). The results are shown in Table 2.

EXAMPLE 9

A solid product (XVI) containing 6.8 mg of titanium in one gram thereof was obtained in a similar way to Example 1 except that 10 g of ferroferric oxide ($Fe_3O_4$) was used. Polymerization of ethylene was carried out in a similar way to Example 1 by the use of the solid product (XVI). The results are shown in Table 2.

EXAMPLE 10

A solid product (XVII) containing 6.7 mg of titanium in one gram thereof was obtained in a similar way to Example 1 except that 10 g of cobaltic-cobaltous oxide ($Co_3O_4$) was used.

Polymerization of ethylene was carried out in a similar way to Example 1 by the use of the solid product (XVII). The results are shown in Table 2.

EXAMPLE 11

A solid product (XVIII) containing 3.5 mg of titanium in one gram thereof was obtained in a similar way to Example 1 except that 10 g of nickel oxide was used.

Polymerization of ethylene was carried out in a similar way to Example 1 by the use of the solid product (XVIII). The results are shown in Table 2.

The results of Examples 6 - 15 are summarized in Table 2.

Table 2

| Ex- No. | Kind of oxides | Solvent | Polymer Formation velocity | | Bulk density |
| --- | --- | --- | --- | --- | --- |
| 6 | ZnO | Xylene | 198 | 0.19 | 0.256 |
| 7 | $SiO_2$ | o-Chloro-toluene | 168 | 0.20 | 0.269 |
| 8 | $Mn_3O_4$ | Xylene | 269 | 0.45 | 0.222 |
| 9 | $Fe_3O_4$ | Xylene | 138 | 0.15 | 0.250 |
| 10 | $Co_3O_4$ | Xylene | 129 | 0.18 | 0.245 |
| 11 | NiO | Xylene | 148 | 0.17 | 0.215 |

EXAMPLE 12

10 g of magnesium oxide and 4 g of anhydrous iron trichloride were mixed and pulverized. 10 g of the resultant mixture was introduced into a 200 ml pear-form bottom flask. 15 ml of benzene and 1 ml of titanium tetrachloride were added thereto, and reacted together under stirring, in the atmosphere of nitrogen at 150° C, for 1 hour. Subsequent operations were carried out in a similar way to Example 1. Thus, a solid product (XIX) containing 4.8 mg of titanium in one gram thereof was obtained.

Polymerization of ethylene was carried out in a similar way to Example 1, using 158 mg of the solid product (XIX) and 290 mg of triethyl aluminum. The amount of the polymer thus obtained was 35.6 g, and the formation velocity of the polymer was 225 g/g/hr. Thus, the activity was much higher than in Comparative Example 3 wherein iron trichloride is absent. MI = 0.35

EXAMPLE 13

10 g of calcium oxide and 4 g of anhydrous aluminum trichloride were mixed and pulverized. 15 ml of monochlorobenzene and 1 ml of vanadium tetrachloride were added thereto, and reacted together under stirring, in the atmosphere of nitrogen, at 140° C, for 1 hour.

Subsequent operations were carried out in a similar way to Example 1, and a solid product (XX) containing 8.5 mg of vanadium in one gram thereof was obtained.

Polymerization of ethylene was carried out in a similar way to Example 1, using 158 mg of the solid product (XX) and 300 mg of triethyl aluminum. The amount of the polymer thus obtained was 28.9 g and the formation velocity of the polymer was 183 g/g/hr. MI = 0.95

EXAMPLE 14

10 g of magnesium aluminate (spinel) and 4 g of anhydrous aluminum trichloride were mixed and pulverized. 15 ml of benzene and 1 ml of titanium tetrachloride were added thereto, and reacted together under stirring, in the atmosphere of nitrogen at 120° C, for 1 hour. Subsequent operations were carried out in a similar way to Example 1, and a solid product (XXI) containing 6.9 mg of titanium in one gram thereof.

Polymerization of ethylene was carried out in a similar way to Example 1, using 169 mg of the solid product (XXI) and 280 mg of triethyl aluminum. The amount of the polymer thus obtained was 48.3 g, and the formation velocity of the polymer was 286 g/g/hr. MI = 0.25

EXAMPLE 15

Polymerization of ethylene was carried out in a similar way to Example 1, using 215 mg of the solid product (I) obtained in Example 1 and 350 mg of diethylaluminum monochloride. The amount of the polymer thus obtained was 23.5 g, and the formation velocity of the polymer was 109 g/g/hr.

EXAMPLE 16

Polymerization of propylene was carried out in a similar way of Example 1, as follows:

Propylene was polymerized at 80° C, for 1 hour, under a gauge pressure of 7 kg/cm², using 183 mg of the solid product (I) obtained in Example 1, 300 mg of triethyl aluminum and 500 ml of normal-hexane. After completion of the polymerization, 21.8 g of a white polymer was obtained by a usual treatment. The formation velocity of the polymer was 119 g/g/hr. Thus obtained polypropylene had the following properties.

[$\eta$] (Intrinsic viscosity in tetralin at 135° C) : 2.15 Normal-heptane insoluble : 53%

EXAMPLE 17

Polymerization of butene-1 was carried out in a similar way to Example 1.

205 mg of the solid product (I) obtained in Example 1, 290 mg of triethyl aluminum and 500 ml of normal-hexane were used. 48 g of butene-1, after fed at room temperature, was heated to 70° C and polymerized for two hours. After completion of the polymerization, 33 g of a white polymer was obtained by a usual treatment. The conversion of butene-1 was 69%.

[η] (in tetralin at 130° C): 1.84

EXAMPLE 18

Copolymerization of ethylene and propylene was carried out in a similar way to Example 1. 185 mg of the solid product (I) obtained in Example 1, 280 mg of triethyl aluminum and 500 ml of normal-hexane were used. Propylene was polymerized at 80° C, for 10 minutes and under a gauge pressure of 7 kg/cm$^2$. After unreacted propylene was purged, a further polymerization reaction was carried out for one hour under a hydrogen gauge pressure of 1 kg/cm$^2$ and an ethylene gauge pressure of 4 kg/cm$^2$.

After completion of the polymerization, 38 g of a white polymer was obtained by a usual treatment. This polymer was confirmed to be a copolymer. This copolymer had the following physical properties.

Density (25° C) : 0.9436 g/c.c. [η] (in tetralin at 130° C) : 1.91

EXAMPLE 19

Copolymerization of ethylene and butene-1 was carried out in a similar way to Example 1. 195 mg of the solid product (I) obtained in Example 1, 280 mg of triethyl aluminum and 500 ml of normal-hexane were used. 0.8 g of butene-1, after fed at room temperature, was heated to 80° C, and polymerization reaction was carried out for 1 hour under a hydrogen gauge pressure of 0.5 kg/cm$^2$ and an ethylene gauge pressure of 4.0 kg/cm$^2$. After completion of the polymerization, 21.6 g of a white polymer was obtained by a usual treatment. This polymer was confirmed to be a copolymer, and this copolymer had the following properties.

Density : 0.9330 g/c.c. [n] (in tetralin at 130° C) : 1.97

EXAMPLE 20

Titanium tetranormalbutoxide was added as an additive in the polymerization of ethylene carried out in a similar way to Example 1.

Using 185 mg of the solid product (I) obtained in Example 1, 0.20 millimole of titanium tetranormalbutoxide, 2.5 millimole of triethyl aluminun and 500 ml of normalhexane, polymerization was carried out at 80° C for one hour under a hydrogen gauge pressure of 1.0 kg/cm$^2$ and an ethylene group pressure of 3.0 kg/cm$^2$.

After completion of the polymerization, 64.3 g of a white polymer was obtained by a usual treatment. The formation velocity of the polymer thus obtained was 348 g/g/hr. and MI was 0.45. A measurement of antistress cracking relative to this polymer was carried out according to ASTM D-1693-60T to give a period of time at 50% breakage of more than 1,000 hours. Thus the polymer was found to have a superior physical property. For comparison's sake, a measurement of anti-stress cracking relative to a polymer which was obtained in a similar manner except that no titanium tetranormalbutoxide was added, was carried out to give a period of time at 50% breakage of 69 hours.

EXAMPLE 21

Titanium tetranormalbutoxide was added as an additive in the polymerization of ethylene carried out in a similar way to Example 1.

Using 185 mg of the solid product (XV) obtained in Example 8, 0.15 millimole of titanium tetranormalbutoxide, 2.0 millimoles of triethyl aluminum and 500 ml of normal-hexane, polymerization was carried out at 80° C for 1 ml hour a hydrogen gauge pressure of 1.0 kg/cm$^2$ and an ethylene gauge pressure of 3.0 kg/cm$^2$.

After completion of the polymerization, 68.0 g of a white polymer was obtained by a usual treatment. The formation velocity of the polymer thus obtained was 367 g/g/hr. and its MI was 0.25. A measurement of antistress cracking relative to this polymer was carried out according to ASTM D-1693-60T to give a period of time at 50% breakage of more than 1,500 hours. Thus the polymer was found to have a superior physical property. Other physical properties of the polymer were as follows:

Density : 0.9320 g/c.c.

Tensile strength : 196 kg/cm$^2$

EXAMPLE 22

Copolymerization of ethylene and styrene was carried out in a similar way to Example 1. 158 mg of the solid product (I) obtained in Example 1, 280 mg of triethyl aluminum and 500 ml of normal-hexane, were used. After 10 ml of styrene was fed, polymerization was carried out at 80° C for 1 hour under a hydrogen gauge pressure of 0.5 kg/cm$^2$ and an ethylene gauge pressure of 3.0 kg/cm$^2$.

After completion of the polymerization, 16.9 g of a white polymer was obtained by a usual treatment. This polymer was confirmed to be a copolymer, which had the following property. [η] (in tetralin at 130° C) : 3.24

EXAMPLE 23

Example 1 was repeated except that 10 g of cupric oxide was used, to give a reaction product containing 6.5 mg of Ti atom in 1 g of the product.

Ethylene polymerization was carried out using this product as in Example 1. The results are as follows:

Polymerization rate : 175 g/g/hr. MI : 0.40 BD : 0.245

Mixing experiments of MgO and AlCl$_3$ and those of Mg(OH)$_2$ and AlCl$_3$

Experiment 1

A mixture of 10 g of commercial MgO and 4 g of commercial AlCl$_3$, prepared by a mere mixing under vibration at room temperature for 20 minutes (Sample A), and a mixture thereof prepared by a ball-mill-mixing by means of Spex Mixer-Mill (manufactured by Spex Industry Co.) at room temperature for 20 minutes (Sample B) were subjected to chlorine content analysis, respectively.

For comparison, a mixture of 6 g of Mg(OH)$_2$ and 9 g of AlCl$_3$, both on sale, prepared by a ball-mill-mixing by means of Spex Mixer-Mill, at room temperature for 20 minutes (Sample D'), and a mixture prepared by heating the Sample D' with stirring at 110° C for 24 hours (Sample D'' ) (corresponding to S.N. 23,484) were subjected to chlorine content analysis, respectively. In either cases, the chlorine content analysis was carried out according to potassium thiocyanate titration method. The results are shown below.

[1] Mixtures of MgO-AlCl$_3$ Sample Cl content (% by weight) A 22.6 B 22.6 Calculated* 22.7

*Purity of AlCl$_3$ used: 99.5%

[2] Mixtures of Mg(OH)$_2$-AlCl$_3$ Sample Cl content (% by weight) D' 46.9 D'' 43.2 Calculated* 47.8

*Purity of AlCl$_3$ used: 99.5%

As seen from the above-mentioned results, it is apparent that, in the mixing treatments of A or B, substantially no reduction in Cl content (i.e. evolution of HCl) was observed, but, in the treatment from D' to D", a considerably large reduction in Cl content (i.e. evolution of HCl) occurred.

What is claimed is:

1. A method for producing polymers of α-olefins which comprises:
   (a) mill-mixing together
      (1) 1 mol of a metal oxide or non-metal oxide selected from the group consisting of $Cu_2O$, $CuO$, $Ag_2O$, $Ag_2O_3$, $MgO$, $CaO$, $SrO$, $BaO$, $ZnO$, $CdO$, $Ga_2O_3$, $SnO$, $SnO_2$, $PbO$, $Pb_2O_3$, $Pb_3O_4$, $ZrO_2$, $Bi_2O_3$, $V_2O_5$, $WO_3$, $MnO$, $Mn_2O_3$, $FeO$, $Fe_2O_3$, $Fe_3O_4$, $CoO$, $Co_3O_4$, $NiO$, $NaAlO_2$, $CaAl_2O_4$, $MgAl_2O_4$, $Mg_2SiO_4$, $MgWO_4$ and $Mg_6MnO_8$ or $SiO_2$ or $B_2O_3$ with
      (2) 0.01–2 mols of a trivalent metal halide from the group consisting of $AlCl_3$, $AlBr_3$ and $FeCl_3$,
   (b) reacting the resultant mixture at a temperature between room temperature and 300° C with a transition metal compound selected from the group consisting of titaniumtetrachloride, vanadiumtetrachloride and vanadiumoxytrichloride in the presence of an aromatic compound selected from the group consisting of benzene, naphthalene, pyridine, toluene, xylene, mesitylene, durene, ethylbenzene, isopropylbenzene, 2-ethylnapthalene, 1-phenyl-naphthalene, dimethylaniline, N-methyldiphenylamine, triphenylamine, nitrobenzene, p-nitrosotoluene, anisole, phenylether, xylenol, and 2, 6-di-t-butyl-4-methylphenol, and
   (c) activating the product of step (b) with an organoaluminum compound selected from the group consisting of trimethylaluminum, triethylaluminum, diethylaluminumchloride, ethylaluminumsesquichloride, and ethylaluminumdichloride so as to thereby form a polymerization catalyst,
   (d) introducing into a polymerization zone that contains said polymerization catalyst
      (1) a monomer selected from the group consisting of ethylene, propylene, and butene-1, or
      (2) said monomer set forth in (d) (1) and a monomer different therefrom consisting of ethylene, propylene, butene-1, hexene1, octene-1, decene-1, 3-methyl-1-butene, 4-methyl-1-pentene, and styrene,
   (e) effecting polymerization under polymerization conditions, and
   (f) recovering the resulting polymerization product.

2. A method according to claim 1 wherein said metal oxide is magnesium oxide.

3. A method according to claim 1 wherein the monomer in (d) (1) and (d) (2) is ethylene.

4. A method according to claim 1 wherein the monomer in (d) (1) and (d) (2) is propylene.

5. A method according to claim 1 wherein the monomer in (d) (1) and (d) (2) is butene-1.

6. A method according to claim 1 wherein the monomer in (d) (1) is ethylene and the monomer in (d) (2) is propylene.

7. A method according to claim 1 wherein the said metal oxide or non-metal oxide set forth in step (a) is mixed together with the trivalent metal halide in a ball mill.

* * * * *